…

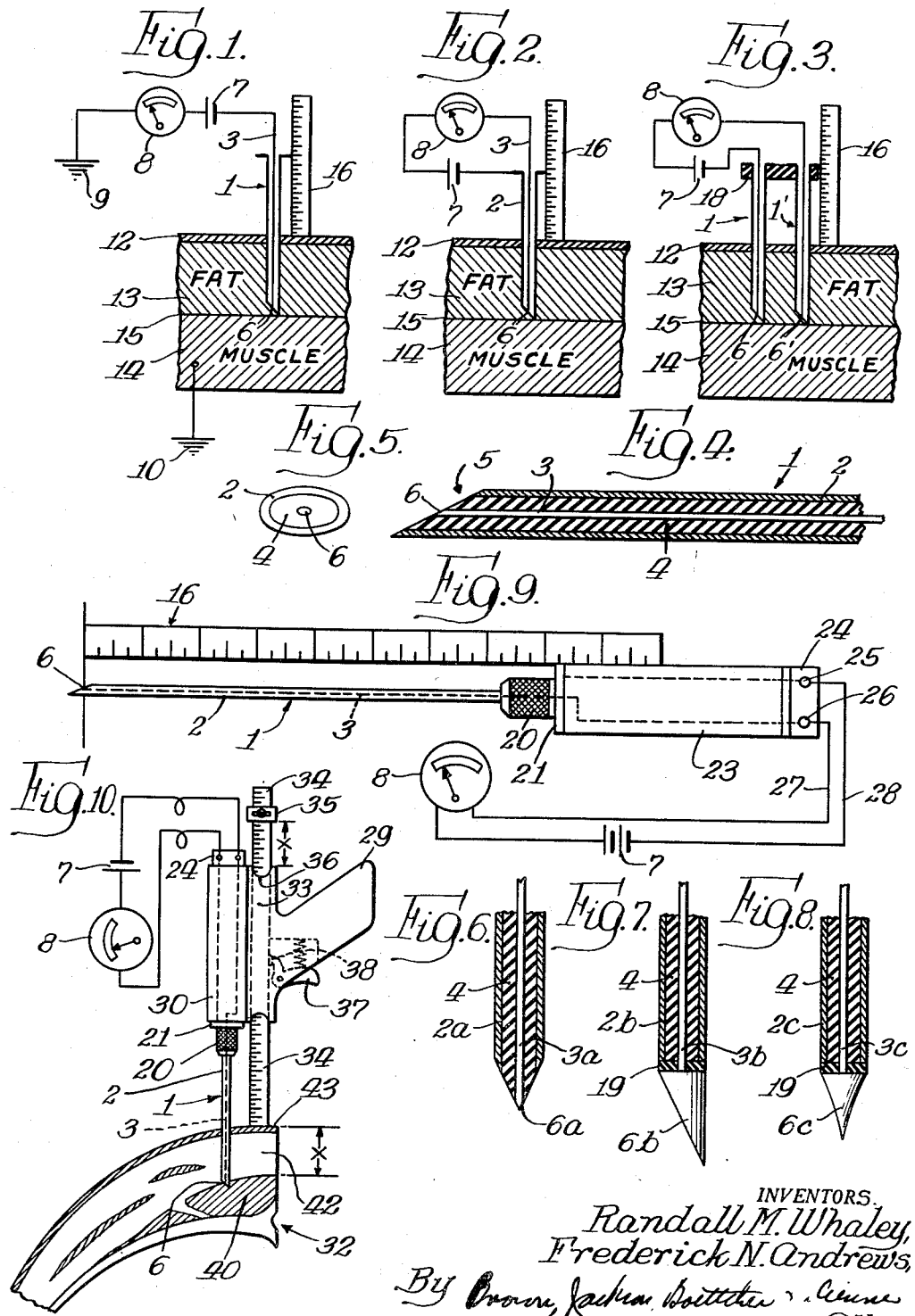

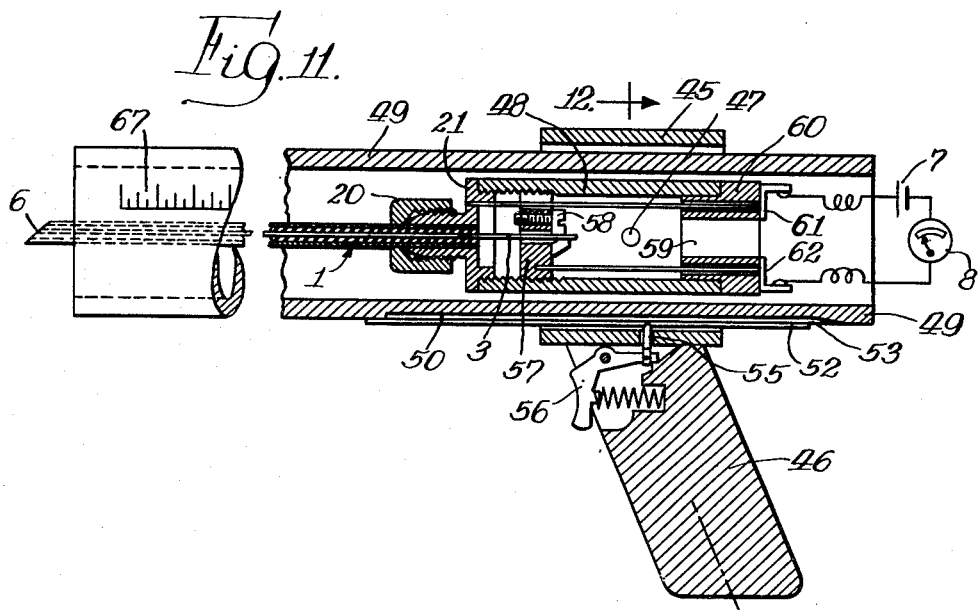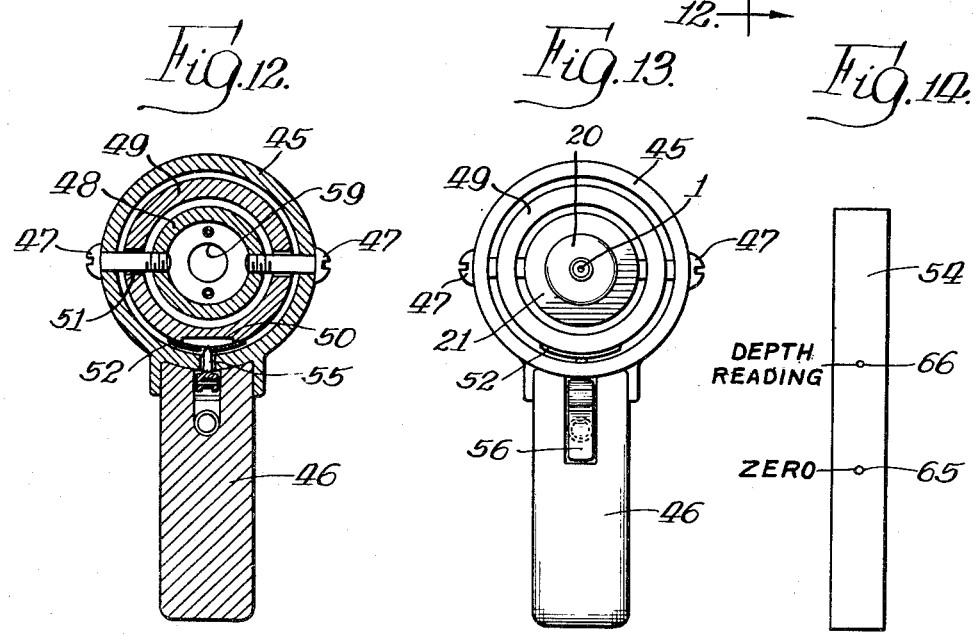

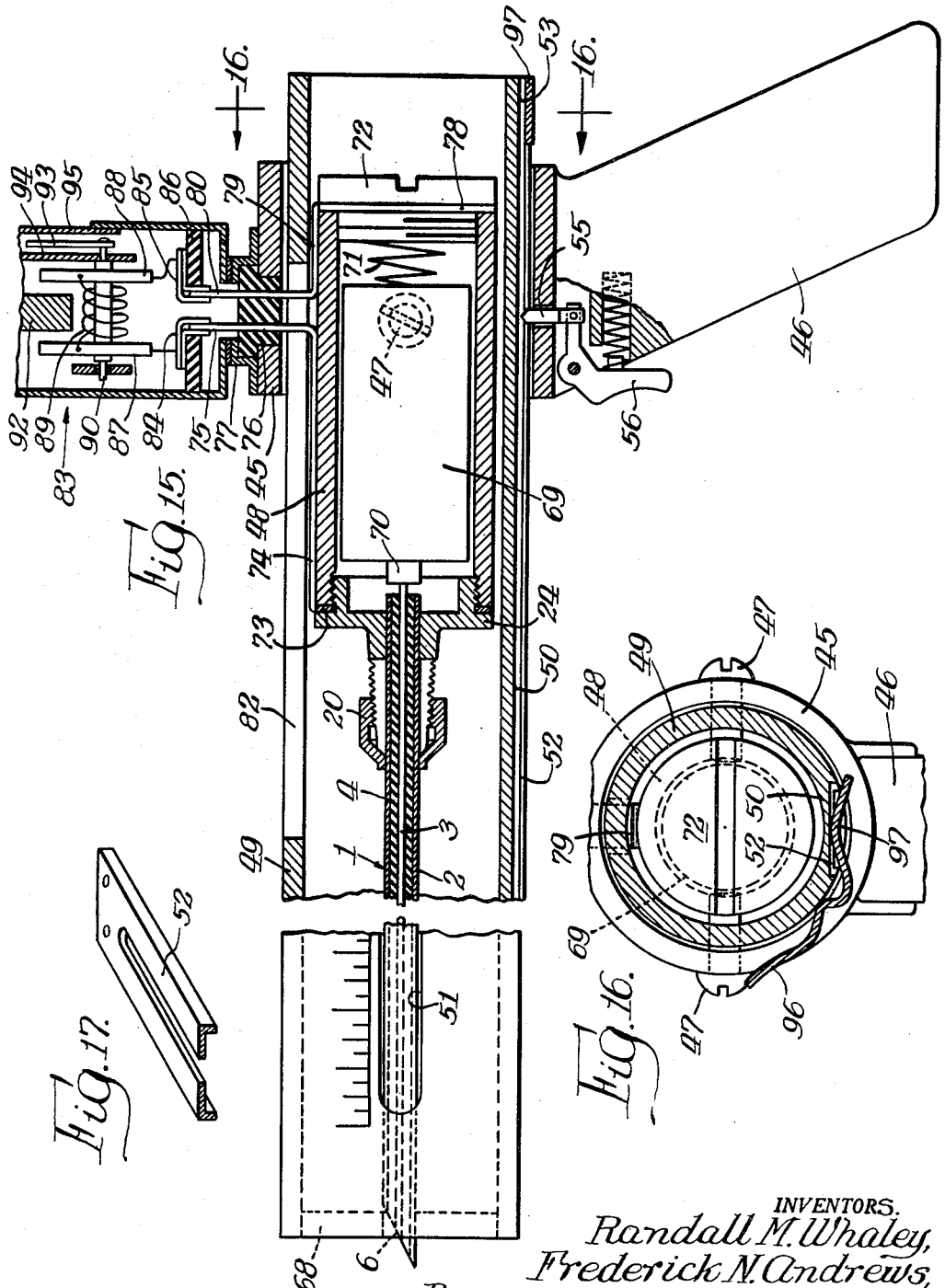

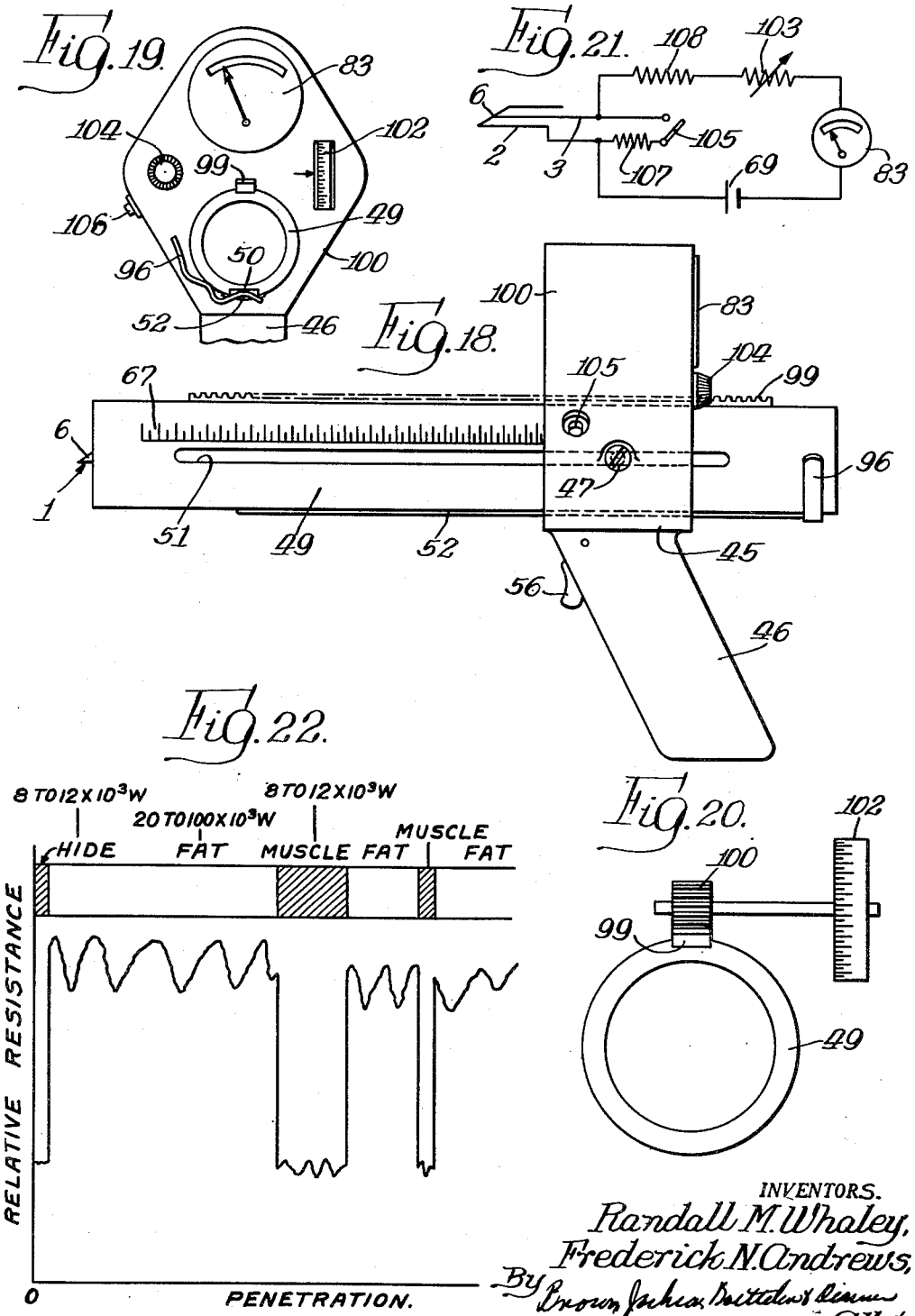

United States Patent Office 2,763,935
Patented Sept. 25, 1956

2,763,935

DETERMINING DEPTH OF LAYERS OF FAT AND OF MUSCLE ON AN ANIMAL BODY

Randall M. Whaley and Frederick N. Andrews, Lafayette, Ind., assignors to Purdue Research Foundation, Lafayette, Ind., a corporation of Indiana Application June 11, 1954, Serial No. 436,081

22 Claims. (Cl. 33—169)

The present invention provides a method of and means for measuring the thickness of a layer of fat and/or muscle on an animal body. While the invention has been brought forth from the needs of the livestock producer, particularly the swine producer, and packing industries, it is not to be confined to the specific animal or to the specific embodiment of the invention herein described. The invention is particularly applicable to live animals. It may also be applied to the carcass.

Of recent years, the market for animal fats, particularly lard, in the United States has suffered substantial shrinkage. Substitutes for lard for various uses have appeared. Also, there is noticeable customer resistance to purchase of overfat cuts of meat. The customer dislikes the purchase of fat which is merely thrown away. Meanwhile, improved feeding methods have tended to fatten hogs more rapidly and to greater degree. Also, the hog raiser has in some cases developed swine that tend to emphasize fat production.

There is a marked pressure upon the industry to reduce the percentage of fat on the carcass in favor of muscle. But the pressure is not at present applied at the right place to get results. The difficulty is that the packer is not able to assay the animal on the hoof accurately, and pay the hog raiser according to the true market value in terms of "quality" which consists in this regard in a desirable ratio of dressed out muscle to fat. If the packer were able to appraise accurately or to apply a recognized quality test to the animal before buying, he could make an appropriate differential in price. This would touch the producer's pocket book, and there would be prompt response.

The problem is well stated in the "Summary and Conclusions" appearing on pages III, IV and V of the booklet entitled "Measuring the Marketability of Meat-Type Hogs" by R. L. Fox, Anna E. Wheeler and C. G. Randell, published by Farm Credit Administration, U. S. Department of Agriculture, Circular C-152, May 1953, to which reference is here made, and from which we quote the following:

"In our present marketing system hogs are bought and sold largely on 'averages' with only small price differentials for quality. Yet in this study individual meat-type hogs were tested that were worth $2 to $3 more per hundredweight than other hogs of the same weight. The problem is to find ways of detecting these values in the live animal and reflecting them back to producers."

The same problem is discussed in other publications.

At present, the only way to estimate the quality of the animal is by visual inspection aided by experience. As pointed out in the aforesaid report, visual appraisal is subject to too great error.

In the course of our investigation of the possibility of determining the actual thickness of the layer of fat between the hide and the meat at one or more points on the outside of the animal, we made the discovery that there is a very pronounced difference in the specific electrical conductivity of muscle as compared to fat, both before and after slaughtering and dressing. The method of our invention may be employed to measure the fat and muscle on the live animal. It may also be employed on the carcass. There are published data giving detailed correlations between back fat in inches and carcass weight as well as the relation of back fat thickness and percent of primal cuts in the carcass.

Selection of breeding stock is greatly facilitated by determining the quality of the animal by the use of our invention. A particularly advantageous feature of the invention is that it permits of the actual measurement of the thickness of the layer of fat or of muscle at a selected location or locations on the body of the live animal without doing substantial injury to the animal. The instrument employed to detect the boundary between muscle and fat is of about the same size as a hypodermic needle, and the insertion of the same is substantially painless and produces a very minor wound that heals readily and promptly.

Our preliminary studies indicated that the muscle tissue which we tested had a conductivity of from about two to five times as great as that of the overlying fat for an applied potential difference of a few volts. Upon placing in contact with suitably spaced electrodes of a circuit containing a sensitive galvanometer and a battery one at a time, a sample of fat and a sample of muscle, a large difference in the galvanometer response was apparent.

Since the fat was found to be of relatively high resistance as compared to the muscle, we conceived the possibility of grounding the animal body to one side of an electrical circuit, and then pushing a slender probe carrying an insulated electrode of restricted exposed area at or near the point of the probe through the hide and the layer of overlying fat into engagement with the muscle. The resistance to current flow should tend to decrease as the probe neared the interface or transition zone and the galvanometer should show a marked decrease of resistance to current flow when the electrode comes into actual contact with the muscle. Upon putting the matter to trial, our conception proved to be correct.

There are various ways of grounding one side of the current to the body of the animal, as will be explained in detail later.

This specific method involves measurement of the resistance between the insulated electrode of the probe and the grounded body. The resistance of muscle tissue being so much lower than that of the fat, a reduction of the resistance occurs as the electrode reaches the boundary between fat and muscle with a relatively sharp increase in current through the galvanometer occuring when the electrode contacts the muscle. The resistance between the muscle side of the boundary and the grounded side of the circuit is low because of the relatively high conductivity of the muscle tissue.

The large difference in conductivity also suggested the possibility of progressively making the test upon relatively small amounts of the respective materials, and yet obtaining an adequate differentiation by the corresponding response of the galvanometer. This would constitute a progressive measurement of the relative specific resistance of the material along the bore of the puncture produced by the needle or probe.

We conceived the possibility of employing for this purpose a probe consisting of a slender needle having near the end designed for penetration, a pair of electrodes so arranged as to have a small gap to be bridged by the material under test. This may take the form of a hypodermic needle with an electrode inside the hollow needle and insulated from the hollow needle by a sleeve of insulation filling the hollow space between the inside wall of the hollow needle and the internal electrode. The point of the probe is preferably shaped like the end of a hypodermic needle, i. e., all three elements are cut off on a plane diagonal to the longitudinal axis of the needle on an angle which may be at an angle of 10° to 20° in accordance with good practice for hypodermic needle designs. One needle so used had a cut at an angle of 12°. The end of the probe may be formed in any other suitable manner, so long as the area of the working gap of the electrodes in contact with the material remains constant for a given probe in contact with the tissue. The significance of a probe of small cross section is that it may be thrust through the skin and underlying tissues of the live animal under test without producing any substantial injury or appreciable pain. Very little tissue of any kind is damaged, and the damage will normally heal quickly.

With the outside sleeve and the internal electrode of the needle connected in a circuit containing a source of potential, such as a few dry battery cells, and a sensitive galvanometer, a continuous indication of the character, i. e., conductivity or its reciprocal resistivity, of the medium in contact with the electrodes may be had as the needle is thrust through the skin and the layer of fat down to the underlying muscle layers. An ohmmeter circuit and instrument may be employed to give the indication in terms of resistance instead of current flow.

While the electrodes remain in contact with fat, so that they are bridged by fat, the reading on the galvanometer indicates low conductivity, but the instant the contacts are bridged by muscle, which in the case of the immediately above described construction occurs as soon as the two electrodes come into contact with the muscle, the galvanometer indicates much higher conductivity. The depth to which the needle has been thrust may readily be measured by any suitable linear measuring instrument. Preferably a measuring slide with a suitable linear scale is carried alongside the needle. Such depth indicating device may give a progressive indication, which is particularly useful where there are layers of fat and muscle. The depth may be measured at the time of or after the indication of conductivity corresponding to muscle to which the electrodes have penetrated has been given. An automatic recorder may be employed to make a record of the current flow or resistance in the circuit.

The means for making the determination of the change of electrical conductivity or resistivity and the determination of the depth at which the change in conductivity or resistivity is found may take various forms. An essential requirement of this specific method is the projection of a probe of suitably small cross section and sensitive to the difference in electrical conductivity between fat and muscle, from the surface, through the layer of fat to the interface or boundary of fat and muscle, and the indication or measurement of the depth to which the probe was projected in reaching that interface or boundary.

Our invention is particularly useful in estimating the quality of live animals, but may also be employed on the carcasses of slaughtered animals or on cuts thereof. In the case of live animals, a single insertion of the probe will generally supply sufficient information to permit a close estimate of the ratio of fat or muscle on the animal because there exists a fairly definite relation between the thickness of fat at a selected point on the back of a pig of a certain weight, length and height, and the total amount of fat on the animal. This has been established from examination of the bodies of many animals with a view to determination of the aforesaid relation. The breed of the animal, and the age and other factors may be taken into account in arriving at an estimate of quality, and hence the proper price to be paid for the animal.

A characteristic of our invention resides in the employment of at least one insulated electrode exposed near the end of the probe, which insulated electrode forms a part of a circuit having an indicator sensitive to variations of current flow. This may be in terms of resistance or of conductivity. The probe is caused progressively to pierce the fat and come into contact with the muscle, whereupon the resistance in the circuit is sharply decreased because the electrode has passed through the high resistance fat and come into contact with the low resistance muscle.

By locating the boundaries of muscular systems, such as the loin muscles, with the subcutaneous fat, exploration with our invention reveals the amount of muscle between the layer of fat and the skeletal structures. In this way estimates of both amount of fat and of muscle can be made.

As indicated above, and as will be disclosed in greater detail below, the method may be carried out in different specific ways, and with a variety of means.

Now in order to acquaint those skilled in the art with the manner of constructing and operating a device embodying our invention, we shall describe, in connection with the accompanying drawings, a specific embodiment.

In the drawings:

Figures 1, 2 and 3 are diagrams illustrating different specific modes of practicing our invention.

Figure 1 shows the use of a needle utilizing a single insulated electrode exposed at the piercing end only;

Figure 2 shows the needle as comprising two electrodes, one of which is insulated and exposed at its piercing end only;

Figure 3 shows the use of two needles, each of which has an insulated electrode exposed at its piercing end only;

Figure 4 is a longitudinal section through a portion of the preferred form of needle utilized in the present invention;

Figure 5 is a plan view of the exposed end of the needle of Figure 4;

Figures 6, 7 and 8 illustrate different forms of exposed electrodes on the piercing end of needles suitable for the practice of our invention;

Figure 9 is a side elevational view of the needle with electric circuit and measuring scale for parcticing the method of our invention;

Figure 10 is a view, partly in section, and partly in side elevation of a needle inserting and measuring instrument of our invention suitable for practicing the method herein disclosed;

Figure 11 is a longitudinal section of another form of instrument for measuring and making a permanent record upon a strip of paper of the depth at which interfaces between fat and muscle occur in making a specific test;

Figure 12 is a transverse sectional view, taken on the line 12—12 of Figure 11;

Figure 13 is a front elevational view taken from the left of Figure 11;

Figure 14 is a plan view of a strip of record paper showing the prick marks indicating the depth of the layer of fat in a particular test;

Figure 15 is a side elevational view, partly in section, of a modified form of a fat depth measuring instrument suitable for the practice of our invention;

Figure 16 is a cross sectional view on the line 16—16 of Figure 15;

Figure 17 is a fragmentary isometric view of the paper holder for holding the paper strip of Figure 14;

Figure 18 is a side elevational view of a modified form of our measuring instrument;

Figure 19 is a rear elevational view taken from the right of Figure 18 of the instrument shown in Figure 18;

Figure 20 is a fragmentary view showing the connection between the slide tube and the depth indicating wheel of the device of Figures 18 and 19;

Figure 21 is a circuit diagram of the instrument shown in Figure 18; and

Figure 22 is a chart explaining the nature of the meter response as the needle is thrust through various layers of the animal body.

No suitable method for determining the thickness of fat and muscle on the body of a live animal has, so far as we are aware, been heretofore available. Surgical procedures including the incision of the skin with a cutting instrument, the dissection of the fat to its union with the muscular structures, and the direct measurement of the fatty layer with a conventional rule has been accomplished. The removal of tissues for study by surgical procedures has been practiced in both man and animals. Such surgical procedures mentioned are time consuming, mar the appearance of the animal and are accompanied by some risk since they open the surface of the body to infectious agents. In general, such procedures cannot be tolerated in connection with the live animal and are usually not suitable even for the dead animal.

Our concept is to do as little injury as possible to the animal tissues, and we do so by the use of an instrument which operates like a needle or awl to displace materials sidewise with a minimum of cutting, that is, only so much cutting as is advantageously employed to accomplish the lateral displacement of the material penetrated.

Preferably, we employ a needle or probe of the general construction shown in Figures 4 and 5, although variants of the same, such as shown for example, in Figures 6, 7 and 8, may be employed. The needle 1 shown in Figure 4 comprises a thin walled stainless steel tube 2 which may, as a suitable exemple, be of an outside diameter of from .058 to .065 inch. The tube 2 is commonly available for hypodermic needles, and we prefer to employ the same in the construction of our needle. The tube 2 contains an electrode 3, preferably coaxially disposed with respect to the tube 2, and insulated from the tube 2 by a tubular sleeve 4 of insulation which fills the annular space between the electrode 3 and the tube 2. We have successfully employed for this purpose a polyethylene tubing cemented in place with Dupont cement. The outer end designed for penetration of the tissues is cut off at an angle which, for example, may be 12° to the longitudinal axis, so as to provide a sloping face 5 which exposes the elliptical face 6 of the central electrode 3. The entire outer surface of the tube 2, including the sloping front end, is exposed to contact with the material penetrated. Only the face 6 of limited area of electrode 3 is exposed to the material through which the needle is extended. In the method of determing the location of the interface between fat and muscle, according to the procedure illustrated in Figure 1, the central electrode 3 is connected to a source of potential 7 which may be a small dry battery of a single cell or of several cells giving from one and a half to six volts, as desired. The circuit is extended through the indicating instrument 8, which is a sensitive galvanometer, namely, an electromagnetic instrument which gives an indication of the rate of current flow therethrough. An instrument of the D'Arsonval or Weston type is suitable. The circuit of electrode 3 is then extended through the instrument 8 to ground at 9.

The animal is connected to ground, as indicated at 10. This may be done in various ways. One way is to have the animal stand upon a mat wetted with a saline solution to impart high conductivity. One side of the circuit is connected to the mat. Alternatively, another electrode, consisting of an exposed metal needle, may be thrust into the body of the animal to provide connection for the body grounded terminal of the above described galvanometer circuit.

The part of the animal upon which we operate comprises the hide 12, the layer of fat 13, and the underlying layer of muscle 14, with a fairly well defined interface 15 forming a boundary or border region between fat and muscle. The hide of the live animal usually presents a conductivity which is generally comparable to the muscle tissue of the animal body. Since, however, it is the first portion of the animal penetrated, its location and indicated conductivity on the instrument presents no problem for interpretation of measurement of subcutaneous tissue layer thicknesses. The fat has a relatively high resistance compared to the muscle. We have found in our experiments that fat generally presents a resistance of two to five times as great as that of muscle. However, the resistance of fat is not uniform. We assume that that is because its structure is not absolutely uniform, as there may be blood vessels and nerves which may be encountered by the needle 1 to a greater or less degree in a specific penetration. However, on the whole, the difference between the conductivity of muscle and fat is so marked that the absolute values are unimportant, and the variations of conductivity or resistance of the respective tissues are inconsequential compared with the difference which shows up at the interface.

When the probe or needle 1 is thrust down through the skin and through the fat and towards the muscle 14, as in Figure 1, the current flow to the electrode face 6 from the body of the animal encounters the resistance of the fat, so long as the electrode face is in contact with the fat. As the electrode face approaches interface, the resistance in the circuit may drop, and generally does so, but upon penetration of the fat at the interface, the electrode face 6 comes into contact with the highly conductive muscle tissue 14, and there is an immediate and pronounced increase in current flow which is readily observable on the galvanometer 8. A linear measuring scale 16, which may be a small ruler or engineer's scale, may be placed lengthwise along the needle 1 to measure the depth to which the point of the needle has penetrated. If, for example, the scale is the same length as the needle 1, then the extent to which the top of the needle drops below the top of the scale when the latter is placed in contact with the surface will give a direct reading of the depth to which the point of the needle has penetrated.

Thus, according to this practice of the method, insertion of the needle connected in the electrical circuit, as indicated in Figure 1, shows initially a low reading of current. This reading tends to rise somewhat as the electrode surface 6 approaches the interface 15, and then sharply increases when the electrode face 6 comes in contact with the muscle 14. When this occurs, the linear scale 16 is consulted to determine the depth to which the face 6 has penetrated, and that measurement is a measure of the combined thickness of hide 12 and fat 13.

Now according to the practice of the invention as illustrated in Figure 2, the indicating circuit with battery 7 and galvanometer 8, may be connected to the exposed sleeve 2 and the central electrode 3. In this case, as the needle is thrust through the hide and fat toward the muscle, the current flow is through the tissue which bridges the gap presented by the insulation 4 as shown in Figure 5 between the exposed face 6 and the tube 2. Thus, the measurement of resistance which is effected is a continuous measurement of a small volume of tissue as the needle progresses through the tissues. This constitutes a continuous testing of the resistance of the material in contact with the tube 2 and the exposed electrode face 6 in the nature of measuring specific resistance or resistivity. It can be seen that so long as the exposed face 6 and tube 2 are in contact with fat, the reading will be that corresponding to the resistivity of fat. While they may vary as above explained, it is always markedly higher than the resistance of muscle when the same comes in contact with the two electrodes. As the needle in Figure 2 penetrates to the point where the advance edge of the tube 2 comes in contact with muscle, the measurement begins to detect the interface or boundary between fat and muscle, and gives an indication of a greater flow of current which, as soon as the exposed face 6 comes in contact with the muscle, then attains the correspondingly high current flow value, due to the gap between the face 6 and the tube 2 being composed sufficiently of muscle, that it gives a correspondingly high indication of current flow which tells the operator that the needle has penetrated into the muscle far enough to be certain that the interface has been passed.

Measurement of the depth of penetration of the needle may be made with the linear scale 16, as in the practice according to Figure 1.

As above stated, the composition of fat is not uniform, and does not present a uniform resistance, probably because of the uneven distribution of nerves and blood vessels. This non-uniformity may be averaged out by employing two needles of the type above described either in parallel, as shown in Figure 3, or with the two gaps in series, as will be understood from the showing of Figure 3.

When the two needles are connected together mechanically by an insulating support illustrated diagrammatically at 18, and are simultaneously thrust into the animal body, the two central electrodes, with their exposed faces 6 and 6', are connected in series through the galvanometer 8 and battery 7, and the material between the two electrodes is then subjected to the potential for determining the resistivity, or the reciprocal thereof, the conductivity, in the medium between them. The outer sleeves of the two needles are not connected in circuit, but serve merely to provide the necessary mechanical support for the central electrodes and their exposed faces 6 and 6'. These exposed faces are the active elements in contact with the material under test. It can be seen that while the two faces 6 and 6' are connected in series through the intervening animal tissues, this constitutes merely a modification of the method shown in Figure 2, wherein a greater length of the material is under test, in order to secure an averaging out of inequalities.

If desired, the two needles 1 and 1' may be connected with the individual gaps between the sleeve and the electrode of each in series with the sleeve and electrode of the other in circuit with the galvanometer 8 and battery 7 for averaging out the inequalities of composition of the material encountered. Thus, two or more needles may be connected in series or in parallel relation to take into account a greater volume of material under test. In each case, the galvanometer indicates, by its increased reading of current flow, when the electrode faces such as 6 and 6' have passed into the muscle, and thereby entered a region of relatively low resistance indicated by a sharp rise in the indication of current flow on the indicator 8. Measurement of the depth of penetration with the scale 16 may be accomplished in the same manner as above described. That is to say, when the indicating instrument 8 indicates that the exposed electrode face 6 has come into contact with lean, the scale 16 is read to measure the depth to which the said face 6 has penetrated below the surface. This then constitutes a measurement of the depth of the hide and fat from which there may be deduced the quality of the animal.

The needle may present the exposed face of the central electrode in various forms. Thus, for example, in Figure 6, the end of the needle and the central electrode may consist of a conical point. The outer sleeve 2a, the insulation 4, and the electrode 3a may be ground off to a tapered conical point 6a. Alternatively, there may be a square chisel edge or a diagonal chisel edge defined by two intersecting planes.

In Figure 7, the central electrode 3b has attached thereto a tip 6b which is insulated from and projects out beyond the end of the sleeve or tube 2b and is insulated by an insulating washer 19 from the end of the sleeve or tube 2b. The tip 6b may have any desired shape adapting it for easy penetration of the tissues involved.

In Figure 8, the central electrode 3c is provided with a conical pointed tip 6c which is insulated from the metal sleeve or tube 2c by the insulating washer 19. The metallic parts of these structures should all preferably be made of stainless steel or other electrical conductive materials resistant to fats and fatty acids. This is desirable, since the instrument should be kept clean, bright and sterile, for obvious reasons.

In Figure 9, we have shown a simple form of instrument for performing the method of our invention. It comprises a needle 1, such as illustrated in Figures 4 and 5, gripped in a cone chuck 20, which cone chuck is part of a fitting into the end of a sleeve of insulation 23, the said fitting having a flange at 24, and being threaded into the open end of the said sleeve 23. At the rear end of the sleeve, there is a plug of insulation 24 which mounts a pair of terminals 25 and 26 for connection thereto of the indicating circuit wires 27 and 28, connecting the indicator 8 and battery 7 in series with the central electrode and the sleeve, respectively, of the needle 1. The linear scale 16 may be employed separately as shown, or if desired, it may be fitted in a slide carried on or in the sleeve 23, as in Figure 10. By means of the scale 16, the depth of penetration may be measured when the indicator 8 detects the presence of muscle in contact with the exposed face 6 of the central electrode.

Suitable means for performing the process may be combined for greater convenience in handling, one such combination being illustrated in Figure 10. In the device of Figure 10, a laterally extending grip or handle 29 has been attached to the needle carrying body or frame 30 for ease in thrusting the needle into the body of the animal, a part of which is indicated more or less diagrammatically in cross section at 32. The needle 1 is held to the frame or body portion 30 by a fitting 21 carrying the chuck 20, which grips the outer cylindrical surface of the needle, providing the necessary mechanical support. The central electrode 3 which terminates in the exposed face 6, is connected in series through the battery 7 and indicator 8 with the outer sleeve 2 of the needle 1, as illustrated also in Figure 9. The flexible leads from the battery 7 and galvanometer 8 are connected to terminals on the terminal block 24 at the rear or upper part of the frame 30.

The frame 30 further provides a housing 33 for a linear slide or scale 34, which has an adjustable collar 35 clamped thereto in such position that the lower end of the scale lies even with the exposed electrode 6 when the said collar 35 engages the upper end of the slide housing 33. A suitable inspection notch or window 36 is cut in the slide housing to facilitate reading of the numbers on the scale, and a friction holding means in the form of a spring-loaded trigger 37 and braking shoe 38 is arranged to hold the scale in any position to which it is moved.

The operator selects the point on the animal body where he wishes to determine the thickness of fat or muscle. With the scale 34 lowered to the point where the lower end is even with the exposed electrode 6, the collar 35 being in engagement with the rear end of the slide housing 33, the operator presses the needle downwardly through the hide 43 and through the layer of fat 42 watching the needle to see when it suddenly gives a substantially greater indication of current flow. At this point he may press the trigger 37 to hold the slide 34 against movement, and withdraw the needle, and read the distance X on the scale 34. Thus, when the indication on the galvanometer 8 is that the exposed electrode face 6 has made contact with the muscle tissue 40, as shown in Figure 10, the operator squeezes the trigger 37 to apply the brake shoe 38 to the slide 34 and withdraws the needle 1 and makes a reading of the displacement distance X on the scale 34.

In the embodiment of Figures 11 to 14, we have provided means for thrusting the needle into the body of the animal, making the desired determination through electrical measurement of the location of the interface or boundary between fat and muscle, indicating the distance of penetration where said interface is found, and in addition, making a record on a strip of paper of the said depth of penetration which it will be understood is equal to the thickness of the layer of fat.

In this form of the device, an annular frame or ring 45 is connected to a hand grip or handle 46, by which the instrument may be manipulated to thrust the needle into the body of the animal. The frame ring 45 connects by a pair of screws 47—47 to an inner sleeve member 48, which also constitutes a part of the main frame. The screws 47—47 extend through slots 51 in the side walls of the measuring slide 49, and are threaded into the side walls of the said frame sleeve 48. The measuring slide 49 has a groove 50 covered by a slotted sheet metal guard or cover 52 which groove 50 and slotted cover 52 are disposed on the bottom side of the sleeve 49. An opening at 53 permits a strip of paper or cardboard to be inserted endwise into the pocket formed between the said guard 52 and the walls of the groove 50 and held there. Such a strip 54 is shown in Figure 14. A strip 54 may be inserted endwise through opening 53 at the right hand end of the sleeve 49 and the central part of the strip is exposed to the perforating or puncturing pin 55, which is guided in the hole in the ring frame 45 and operated by a spring retracted trigger 56 carried by the handle 46. The inner frame sleeve 48 carries a metal fitting 21 having a clamping chuck 20 for gripping the rear end of the needle 1, and the central electrode 3 extends through a metallic web 57 and is gripped by an eccentric screw 58 accessible through an opening 59 in the closure plug 60 for the rear end of the central frame sleeve 48. The chuck 20, which connects with the outer sleeve of the needle 1 and the web 57 which connects with the inner electrode 3, are connected by suitable conductors with the terminals 61 and 62, which in turn through flexible conductors are connected in series with the battery 7 and indicator 8.

In the utilization of the device of Figure 11, the sleeve 48 containing the needle 1 is placed over the spot where the measurement of fat thickness is to be made. The operator presses down on the handle 46 thrusting the needle through the hide and into the fat, and then on through to the muscle as shown in connection with Figure 10. At this point, the indication on the instrument 8 will tell him that the exposed electrode face 6 is in contact with the muscle, and that the depth of penetration is therefore equal to the distance from the surface to the interface between fat and muscle. When the instrument is prepared for use, a fresh strip 54 is inserted in the groove 50, and when the instrument is first set down upon the animal with an indication on the indicator 8 that the circuit is closed, the operator presses the trigger 56 to make the initial prick or puncture 65 which indicates zero in distance of penetration. He immediately releases the trigger 56, and presses down to thrust the needle home. As the needle penetrates the body of the animal, the slide 49 is raised, being guided between the frame ring 45 and the inner frame sleeve 48 and the slots through which the fastening screws 47 are extended. When the instrument 8 indicates that the electrode face 6 has engaged muscle, the operator presses the trigger 56, producing a prick mark 66, as shown in Figure 14, which constitutes the depth indication or reading with respect to zero prick mark 65. It will be understood that the slide 49 may carry a scale, as indicated at 67 in Figure 11, which will give a direct reading of the depth of penetration.

The instruments thus far described have the disadvantage that the indicator 18 and the battery 7 must be supported separately from the needle-carrying instrument and connected by flexible wires. We deem it advantageous to provide an instrument which carries the source of potential and the instrument itself so that the device is not only self-contained, but also so that the indicating instrument 8 may be in convenient position to be read as the needle is thrust home. It is obvious that a source of current might be provided in the sleeve 23 in Figure 9, and in the frame 30 of Figure 10, but that would still leave the instrument to be connected by flexible leads to the indicator 8. Likewise, the battery may be housed with the indicator or galvanometer 8, but that does not cure the difficulty. In Figures 15, 16 and 17, we have shown a device for making the determinations of fat thickness which is a self-contained instrument.

In this instrument, the frame ring 45 is connected to the hand grip 46 in the same manner as shown in connection with Figure 11. This frame ring 45 is connected in turn through the two bolts 47—47 extending through slots in the slide sleeve 49 to connect the said frame ring 45 with the inner frame sleeve 48. The inner frame sleeve 48 in turn, through the fitting 24 and chuck 20, serves as a support for the needle 1 which extends out through an opening in an end wall 68 which end wall provides a flat bearing surface for the said slide sleeve 49 to facilitate introduction of the needle 1. The inner frame sleeve 48 provides room for a dry battery cell 69, the central electrode 70 of which is pressed against the projecting end of the electrode 3 of the needle. At the rear end of the battery 69, a closure plug 72 compresses a coil spring 71 against the bottom of the dry cell 69 to make contact with the casing or zinc electrode of said cell. The fitting 24 at the front end of the frame sleeve 48 clamps a contact ring 73, which, by means of a strap conductor 74, extends the connection to the vertical prong 75, which constitutes a stationary contact stud. This prong or stud 75 is held in a plug of insulation mounted in the frame ring 45, and held in place by a clamp 77. Similarly, the closure fitting or plug 72 at the rear of the frame sleeve 48 clamps a conducting ring 78 similar to the ring 73 and the connection is extended through a conductor 79 to a second prong or contact stud 80. It is likewise held in the plug of insulation 76. These two studs or prongs extend up through a slot 82 formed in the upper wall of the sliding sleeve 49. A detachable galvanometer instrument 83 is mounted mechanically and electrically upon the studs or prongs 75 and 80, and has its indicating face turned in the opposite direction from the needle, so that the operator may view the indications of the galvanometer as the needle is thrust into the animal body. The galvanometer 83 is indicated diagrammatically and the details thereof may be varied. The spring jaws 84–85 are mounted on a frame plate 86, and they connect through suitable hair springs 87–88 to a pivoted coil 89, which is mounted upon a rotatable shaft 90 in proximity to a permanent magnet 92. An indicating needle 93 plays over a scale or chart 94 placed behind a transparent cover 95. Standard instruments are available for this service and the above diagrammatic illustration and explanation is believed to make clear the requirements.

The groove 50, in which the strip chart 54 of Figure 14 is disposed, is held in place by the slotted spring cover 52. This cover may be manipulated to lift it off of the card or strip 54 by an integral ear 96 which forms a lever at the rear end of the slide 49 for raising the central part 97 to permit the introduction of the chart or strip 54 and for thereafter gripping the same. The trigger 56 and pin 55 are employed to make a prick mark of the zero reading and of the depth reading, as indicated on the strip chart 54 of Figure 14.

In use, the instrument is pressed against the body of the animal, for example, over the sacrum, over the mid back, or over the shoulders, as the case may be, the end wall 68 providing a flat bearing for the sleeve 49. The operator pushes the handle 46 downwardly, thrusting the point of the needle through the hide and into the fat layer to be measured. The instrument 83, which corresponds to the separate galvanometer instrument 8 heretofore referred to, is mechanically and electrically connected to the handle and frame, and the face of the instrument is in front of the operator as he inserts the needle 1.

When he first applies the needle 1 in place and secures an indication on instrument 83, he presses the trigger 56 to make the zero prick mark, as indicated at 65 in Figure 14, and then when the needle of the instrument indicates a sudden increase in current flow, the operator again presses the trigger 56 to make the depth reading prick mark 66, as shown in Figure 14.

The embodiment shown in Figures 18 to 21 is substantially like the instrument of Figure 15. However, the electrical circuit incorporates means for calibration in the form of a shunt resistance 107 and a variable series resistance 103 to adjust the instrument 83 to the resistances encountered. Also, the depth measuring mechanism provides a direct reading of the depth indication at the same time that the tissues penetrated by the needle 1 are indicated by the electric meter 83.

A longitudinally extending rack 99 is mounted on the upper side of the sliding sleeve member 49, and this rack, as shown in Figure 20, cooperates with the pinion 100 that carries on its shaft a depth indicating wheel 102 graduated in terms of depth of penetration of the exposed face 6 of the inner electrode 1 of the needle. This indicator 102 may be zeroed by an endwise adjustment of the rack 99, not shown, but well understood by those skilled in the art. Furthermore, modification of the gear system in accordance with well understood practice can be made to provide any desired relation between extent of rotation of the indicating wheel 102 and the depth of penetration corresponding to displacement of pinion 100 along rack 99. The indicating wheel 102 may be placed behind a window, or may be exposed as shown in Figure 19. A variable rheostat 103 for scale adjustment of the meter 83 has an adjustment knob 104 on the face of the casing 100, which casing is mounted upon the frame ring 45 or its equivalent frame member. A normally open switch member 105, having an exposed operating button 106, is provided to close the circuit through the high resistance 107 across which resistance the inner electrode 3 and the outer tube electrode 2 of the needle are connected. One or more dry cells may be carried in the inner frame sleeve of the instrument of Figure 18, or the dry cells may be disposed in the hand grip 46, which may be made of suitable length and hollow for that purpose.

The push button 106 closes the circuit through the high resistance 107 which may, for example, be 4,000 ohms when the voltage of the battery 69 is of the order of one and one-half to six volts, and the meter 83 is of the order of one milliampere for full scale reading. When the switch 105 is closed, this resistance 107 provides a value comparable with resistance of muscle tissue and hence enables the operator to pre-adjust, by means of rheostat 103, the meter scale reading to a value designated as muscle on the scale. This feature of the instrument is optional. The adjustable rheostat 103 is provided to adapt the meter circuit to such scale readings as are desirable under the particular circumstances of use.

In Figure 22, we have shown a diagram of the relative resistance as the needle penetrates hide, fat and muscle. Thus, at the top of Figure 22, is indicated diagrammatically in section the thickness of hide, fat, muscle and fat on a somewhat exaggerated scale. The heavy line graph or curve on the rectangular coordinates indicates the relative resistance at the points of travel of the needle as it moves from left to right through the hide, through the first layer of fat and through the muscle and then again through fat, and finally through a thin streak of muscle and again through and into a layer of fat. It will be observed that the relative resistance of the muscle is of the order of 10,000 ohms, which, however, is relative, as compared with from 20,000 to 100,000 ohms for fat. The hide usually runs around the figure of 10,000 ohms, and is comparable to the muscle. The above recited figures of ohms are relative figures and not absolute figures. So far, we have found it difficult to secure an accurate determination of the specific resistance of fat, muscle and hide. Absolute values are unimportant, since it is the relative values which give the indication. It is a sudden jump of reading which indicates the crossing of a boundary.

It is optional within our invention to have the resistance between the parts of the circuit controlled by the piercing needle 1 in simple series relation with the galvanometer and source of current, as in Figures 1, 2 and 3, or to have the variable resistance 103 and fixed resistance 108 as in Figure 21 in series relation to adjust the meter reading to suitable values for tissue resistances encountered. In the first case choice of battery voltage and meter sensitivity would depend upon tissue resistance encountered by the needle to insure desirable meter readings. The latter case incorporates a variable resistance for such adjustment within the circuit. Other circuits, such as the well known Wheatstone bridge circuit, may be employed for measuring the resistance across the needle gap. This frees the circuit from variations of voltage. While we have shown the use of batteries for a source of potential, that is based upon convenience and not necessity, alternating current of low voltage may equally serve where it is convenient. Generally low voltage of from one and a half to twelve volts is ample.

Where it is desired to measure the depth of layers of fat and muscle, the pronounced changes in resistance in going from one medium to the other may be recorded on the record strip by appropriate manipulation of the trigger to make prick marks at the points where these changes occur.

In our tests on live animals and on carcasses, we find the instrument to be accurate within $\frac{1}{16}''$. In our experiments, we have at times thrust the needle through the hide, the layer of fat and into contact with the muscle and made the measurement of depth, and then partly withdrawn the needle and again advanced it into contact with the muscle, and we find a close correspondence between the successive measurements at which the indication of contact with the muscle is made. Exact correspondence between the measurements may be prevented by flow of blood into the wound first opened.

However, the method is sufficiently accurate as to give in connection with known relations between fat thickness on the body of the animal at certain locations a very greatly improved appraisal of the quality of the animal. In the course of our experiments, we have employed a Weston ohm meter, employing the concentric electrodes of the dimensions above given and arranged as shown in Figure 2 above, and we find, in general, that muscle tissue gives a reading in the range of from 7,000 to 12,000 ohms, generally around 10,000, and fat tissue gives a reading of from 20,000 to 100,000 ohms. The readings on penetrating the skin or hide are about the same as for muscle tissue, namely, around 10,000 ohms, and varying from 7,000 to 12,000. The change in going from one tissue to another is so pronounced as to leave no doubt as to the location of the boundary between them.

Electrodes differing in area exposed to tissue and in size of gap separating the electrodes in contact with tissue provide different resistance readings in absolute magnitude, but the relative values for muscle and for fat tissue remain markedly different. This relative difference is pronounced and suffices to locate the boundary between muscle and fat tissue.

On a typical determination, and as recorded on the paper strips of Figure 14, we find, for example, that hog A showed a depth to muscle, including skin and fat, on shoulder 1, as 37 millimeters in and 38.5 millimeters out. On shoulder 2, 34 millimeters in, and 36 millimeters out. On mid back side 1, 30 millimeters; mid back side 2, 28 millimeters; at the sacrum, side 1, 32 millimeters; and on sacrum, side 2, 31 millimeters.

The reference above to "in" and "out" means the readings of depth as the instrument is inserted and first makes contact, and "out" refers to the depth where withdrawal of the needle gives the electrical indication that the electrode has left the muscle tissue. The slight difference shown at the shoulder readings between "in" and "out" is probably accounted for by different pressures on the guide sleeve and by the flow of blood into the space vacated by the needle.

On hog B, which was a fat animal, as compared with hog A, the measurements on shoulder 1, showed a depth of fat and hide of 59 millimeters, and on shoulder 2, showed a depth of 55 millimeters. This 4 millimeters difference may be due in part to the fact that the hog was moving, and the pressure on the guide sleeve varied.

The above readings were made according to the scheme of Figure 2, and with the instrument substantially as shown in Figure 11.

On another test of another hog three measurements on the same shoulder gave fat depths as measured on a punched record strip of 35, 36 and 38 millimeters, respectively. Records of fat depths at the loin obtained by three separate insertions of the electrodes gave depths of 32, 32.5 and 33.5 millimeters, respectively. These tests also illustrate the accuracy and reproducibility of the method of our invention.

It is to be observed that the method also enables one to measure not only the thickness of fat overlying muscle but the thickness of any layer of fat or of muscle within the animal body. For example, thickness of a layer of fat in muscle would be measured by insertion of the electrode through the skin and through the overlying fat tissue noting the first boundary between fat and muscle tissue when the meter indicates a sudden decrease in tissue resistance. After reading or recording the depths of this boundary the electrode is further inserted until the meter indicates an abrupt increase in resistance corresponding to its leaving muscle tissue and penetrating fat again. Comparison of the reading and this boundary between muscle and fat with the former reading provides the thickness of the muscle tissue penetrated. In case the muscle overlies bone, as for example in the loin muscle, the electrode would be inserted to the first boundary between fat and muscle and then after due recording or reading the depth of said boundary would be advanced through the loin muscle until the electrode strikes and is stopped by bone.

We claim:

1. The method of locating relative to a predetermined surface, the position of the boundary between fat body tissue on an animal body and muscle body tissue, which comprises pushing an electrode through one tissue toward the other, passing a current through the electrode and the material with which said electrode is in contact, and upon the occurrence of a marked change in current flow measuring the distance of the electrode from said surface.

2. The method of determining the thickness of layers of fat and muscle of an animal body which comprises thrusting an electrode of limited exposed area into the body, applying potential to the electrode, and measuring the depth of penetration of the body of said electrode where the current flow changes by a factor of the order of two or more, said changes indicating a transition from fat to muscle or vice versa.

3. The method of determining the depth of a layer of fat overlying muscle of an animal body, which comprises thrusting an electrode down through the fat into electrical contact with the muscle, impressing electrical potential upon said electrode, measuring the flow of current produced by said potential to determine when the electrode is in contact with muscle, and measuring the depth of penetration at which said contact occurs.

4. In the method of determining the thickness of a layer of fat overlying muscle in an animal body, the novel steps which comprise impressing a difference of electrical potentail upon an electrode and the body of an animal, thrusting the electrode into the body in a direction substantially normal to the layer of fat until a marked increase in current flow through said electrode occurs due to contact between said electrode and the muscle under said layer of fat, and measuring the depth of penetration of said electrode at which said marked increase in current flow occurs.

5. The herein disclosed method which comprises the steps of producing a puncture through a layer of fat on the body of an animal down to a layer of muscle, simultaneously measuring the relative conductivity of the material along the walls of the puncture, and measuring the depth of the puncture when a pronounced increase of the relative conductivity is encountered.

6. In a device of the class described, a needle having a pointed outer end, said needle carrying an insulated electrode exposed at the point of the needle, a frame for supporting the rear end of the needle, said frame including an electrical terminal for making electrical connection with the insulated electrode, a depth measuring slide embracing the needle, said slide being slidably mounted on said frame, a laterally extending handle member connected to the frame for thrusting the needle into the subject animal, and an electrical indicator for indicating the relative conductivity of the material in contact with the exposed portion of said electrode connected in conductive relation to said electrode.

7. The device of claim 6 wherein said indicator is mounted on said frame facing toward the rear of the frame, and a source of current in series with said electrode and indicator carried on said frame.

8. In combination a hollow needle having an inner insulated electrode exposed adjacent the outer end thereof, a frame comprising a needle carrier connected to the inner end of the needle and including means for making electrical connection with the needle and said inner electrode, an electrical indicator of the electromagnetic type for indicating the relative conductivity of the material in contact with the exposed portion of said electrode, said indicator being mounted on said frame and facing rearwardly of the needle, and a transverse hand grip connected to the frame for thrusting the needle into the subject animal.

9. The combination of claim 8 with a depth measuring element slidably mounted in the frame and extending lengthwise of the needle.

10. In a device of the class described, a frame, a hollow needle with an inner insulated conductor terminating in an exposed electrode spaced by a small gap from the adjacent end of the needle, said needle being carried on said frame, electrical connections carried by the frame for making connection with the needle and said insulated conductor, a depth measuring slide, slidably mounted in said frame, said slide having a chart carrier, a transverse handle connected to the frame, and a marker for marking a chart in said carrier, said marker having an operating member mounted on said handle.

11. In combination, a frame comprising a central sleeve, a needle, a chuck for connecting said needle to said sleeve, a depth measuring member comprising a slotted slide guided to move endwise along the outside of the central sleeve, a hand grip, a frame ring mounted on the hand grip and having pins extending transversely through said slotted slide for connecting to the central sleeve.

12. The combination of claim 11 with a card holder carried on the slide and a registering marker having an actuating member carried by the hand grip.

13. The combination of claim 11 wherein the needle comprises two conductors insulated from each other and one of said conductors being exposed only at the outer end of the needle, said central sleeve carrying electrical connections to said two conductors, an electrical conductivity indicator, said indicator being connected to said connections, a card holder carried by the slide and a marker for marking a card in said holder, said marker having an actuating member carried by the hand grip.

14. In a device of the class described, a barrel-like frame member, a laterally projecting handle for said frame member, a slender piercing probe, a chuck on the forward end of said frame member, the inner end of said probe being gripped by said chuck, said probe comprising a longitudinally extending insulated conductor terminating at the free end of the probe in an exposed electrode, an electrical connection for said insulated conductor carried by said frame member, and a depth gauge member carried on said frame and guided for longitudinal sliding motion relative to said probe.

15. The device of claim 14 characterized by a record strip holder for holding a record strip in fixed relation on said depth gauge member, and a marking device for marking a record strip in said holder, said marking device being carried on said frame and being readily accessible to the hand of the operator when the hand grasps said handle.

16. The device according to claim 15 having an electrical current flow indicator carried on said frame member and having a dial facing toward the rear end of said frame member, said indicator being connected to said electrical connection carried by the frame member.

17. The method of determining the thickness of fat overlying muscle in an animal body, which comprises puncturing the layer of fat down to the muscle, applying an electrode of limited area to the material along the walls of the puncture to determine the conductivity thereof, and recording the depth at which a marked increase in conductivity is found.

18. The method of determining the thickness of fat overlying muscle on an animal body, which comprises opening a passageway through the fat to the muscle, measuring the conductivity of the material along the walls of the passageway, and recording the distance along said passageway where a pronounced change in conductivity occurs.

19. The method of determining the thickness of fat overlying muscle on an animal body, which comprises forcing an electrode of limited exposed area through the layer of fat toward engagement with the muscle, impressing a difference of potential upon the muscle and upon the electrode, indicating the resultant flow of current between them and recording the distance of penetration when a marked increase in current flow is indicated.

20. The method of determining the thicknesses of layers of fat and muscle of an animal body which comprises, puncturing the fat and muscle of the body, measuring the conductivity of the material along the walls of the puncture, and recording the distances, along the walls at which marked differences in conductivity exist.

21. The method of determining the thicknesses of layers of fat and muscle of an animal body which comprises, forcing an electrode of limited exposed area into the body, applying potential to the electrode, measuring the conductivity of the material along the walls of the puncture, and recording the distances along the walls at which marked differences in conductivity exist.

22. The method of determining the thicknesses of layers of fat and muscle of an animal body which comprises, puncturing the fat and muscle of the body, measuring the conductivity of the material along the puncture simultaneously with marking of the same, and observing the distances along the puncture at which marked differences in conductivity exist.

References Cited in the file of this patent

UNITED STATES PATENTS

| | | |
|---|---|---|
| 1,913,595 | Hyman et al. | June 13, 1933 |
| 2,053,938 | Barker | Sept. 8, 1936 |
| 2,184,338 | Ennis | Dec. 26, 1939 |
| 2,222,608 | Elliott | Nov. 26, 1940 |
| 2,437,697 | Kalom | Mar. 16, 1948 |

FOREIGN PATENTS

| | | |
|---|---|---|
| 237,635 | Germany | Aug. 25, 1911 |